US006521832B2

(12) United States Patent
Lange

(10) Patent No.: US 6,521,832 B2
(45) **Date of Patent: *Feb. 18, 2003**

(54) CABLE TERMINAL OR JOINT MEANS

(75) Inventor: Ralf Lange, Horn-Bad Meinberg (DE)

(73) Assignee: Phoenix Contact GmbH & Co. KG, Blomberg (DE)

(*) Notice: Subject to any disclaimer, the term of this patent is extended or adjusted under 35 U.S.C. 154(b) by 0 days.

This patent is subject to a terminal disclaimer.

(21) Appl. No.: 09/989,099

(22) Filed: Nov. 21, 2001

(65) Prior Publication Data

US 2002/0079123 A1 Jun. 27, 2002

(30) Foreign Application Priority Data

Nov. 22, 2000 (DE) ........................................ 100 58 158

(51) Int. Cl.[7] .................................................. H02G 3/18
(52) U.S. Cl. .................................. 174/65 SS; 174/65 R
(58) Field of Search .......................... 174/65 SS, 65 R, 174/74 A, 84 C, 93, 73.1, 17 VA, 17 CT, 51, 87; 285/256, 257, 319, 322, 323, 331; 403/326, 329; 439/411, 412, 413, 414, 404

(56) References Cited

U.S. PATENT DOCUMENTS

| | | | | | |
|---|---|---|---|---|---|
| 3,397,379 | A | * | 8/1968 | Puig | 439/414 |
| 4,169,967 | A | * | 10/1979 | Bachle | 174/65 SS |
| 4,600,803 | A | * | 7/1986 | Holzmann | 174/65 SS |
| 4,686,738 | A | * | 8/1987 | Bladh | 174/65 SS |
| 4,787,657 | A | * | 11/1988 | Henniger | 174/65 SS |
| 4,930,815 | A | * | 6/1990 | Tuggler, Jr. | 285/331 |
| 5,350,204 | A | * | 9/1994 | Henniger | 174/65 SS |
| 5,600,094 | A | * | 2/1997 | McCabe | 174/65 SS |
| 5,691,505 | A | * | 11/1997 | Norris | 174/51 |
| 5,920,035 | A | * | 7/1999 | Haney et al. | 174/65 SS |
| 5,947,532 | A | * | 9/1999 | Lorenz | 285/323 |
| 5,989,056 | A | * | 11/1999 | Lange et al. | 439/412 |
| 6,403,884 | B1 | * | 6/2002 | Lange | 174/65 R |

FOREIGN PATENT DOCUMENTS

DE 199 51 455 10/2001

* cited by examiner

*Primary Examiner*—Dean A. Reichard
*Assistant Examiner*—Angel R. Estrada
(74) *Attorney, Agent, or Firm*—Nixon Peabody LLP; David S. Safran

(57) ABSTRACT

A cable terminal or joint connection for making electrically conductive connection of a multi-core cable to an electrical device or to another multi-core cable, including a cable terminal component having a union nut and a wire receiving and guide part and including a device terminal component having a clamping and terminal unit which is provided with insulation piercing connecting devices and with terminal elements, and having a sleeve-shaped terminal body which is provided with an outside thread corresponding to the inside thread of the union nut. When the wire receiving and guide part is assembled with the union nut, the wire receiving and guide part is axially fixed via at least one slotted elastic locking ring in the union nut and the wire receiving and guide part is able to turn while in the axially fixed position relative to the union nut. Additionally, loss of the locking ring prior to assembly is prevented by fabricating the locking ring in one piece with the wire receiving and guide part.

10 Claims, 3 Drawing Sheets

CABLE TERMINAL OR JOINT MEANS

BACKGROUND OF THE INVENTION

1. Field of the Invention

In invention relates to a cable terminal or joint means as disclosed in commonly owned, related patent application DE 199 51 455, which has been filed as U.S. patent application Ser. No. 09/695,415, and is drawn to a cable terminal or joint means for making an electrically conductive connection. The invention relates to a cable terminal or joint means for making an electrically conductive connection between a cable and an electrical device, or for making an electrically conductive connection between two cables. When connecting one cable to an electrical device, the connection is a cable terminal means; while, if two cables are to be connected to one another, the connection is a cable joint means. When the invention is a cable terminal means, the invention includes a cable terminal component and a device terminal component. Further, when the invention is a cable joint means, the electrically conductive connection includes a first cable joint component and a second cable joint component. In the discussion of the invention to follow, most of the focus is on a cable terminal means, but nevertheless a cable joint means is always intended as well.

2. Description of Related Art

In the related German patent application DE 199 51 455, and corresponding U.S. patent application Ser. No. 09/695,415, the electrically conductive connection can be between a multi-core cable and an electrical device, or between two multi-core cables with one cable terminal component and with a device terminal component, or between a first cable joint component and second cable joint component. The electrically conductive connection can also be made between a cable terminal component and a first cable joint component, a device terminal component, or a second cable joint component. The cable terminal or joint means includes a union nut, a wire receiving and guide part which has a plurality of wire guide channels, a clamping and terminal unit which is provided with insulation piercing connecting devices and with terminal elements, and a sleeve-like terminal body or connecting body which is provided with an outside thread which corresponds to the inside thread of the union nut. The wire ends make contact with the insulation piercing connecting devices and are squeezed by the insulation piercing connecting devices, each running at an angle less than 180°, thereby cutting through the wire insulation of the wire ends and making contact with the conductors when the union nut is screwed onto either the terminal body or the connecting body, or when the terminal body or the connecting body is screwed into the union nut.

In the discussion to follow, it is also noted that reference to a cable terminal means is intended to relate to a means for making an electrically conductive connection between a cable and an electrical device; where an electrical device should be understood quite generally, and in particular, the expression electrical device includes electrical components, means and devices.

It is further noted that for the cable terminal or joint means discussion to follow, the cable terminal component and the first cable joint component, the device terminal component, or the second cable joint component includes the following

- a union nut,
- a wire receiving and guide part,
- a clamping and terminal unit which is provided with insulation piercing connecting devices and with terminal elements and
- a sleeve-shaped terminal or connection body which is provided with an outside thread which corresponds to the inside thread of the union nut.

Thus, it is intentionally left open which of the individual parts, for example, the union nut, the wire receiving and guide part, the clamping and terminal unit, or the terminal or connecting body relate to the cable terminal component, the first cable joint component, the device terminal component, or the second cable joint component. However, it can be generally understood that:

- that the union nut generally relates to the cable terminal component or the first cable joint component,
- that the wire receiving and guide part relates to the cable terminal component or the first cable joint component,
- that the clamping and terminal unit relates to the device terminal component or the second cable joint component and
- that the terminal or connection body generally relates to the device terminal component and the second cable joint component.

It is also noted that the wire ends and the insulation piercing connecting devices run at an angle of less than 180° to each other which means that the wire ends and the insulation piercing connecting devices do not run parallel to one another, because to do so would mean the insulation piercing connecting devices cannot act on the wire ends in the proper manner. The angle between the wire ends and the insulation piercing connecting devices can be both an acute and also a right angle; however, an obtuse angle is also not precluded. Accordingly, the wire guide channels which hold the wire ends and which are provided in the wire receiving and guide part are angled relative to the insertion direction of the cable. In order to ensure simple deflection of the wire ends during insertion that angle should be less than 90°.

Finally, it is noted that when the union nut is screwed onto the terminal or connecting body or when the terminal or connecting body is screwed into the union nut, the insulation piercing connecting devices cut the wire insulation of the wire ends and make contact with the conductors. Screwing the union nut onto the terminal or connecting body or screwing the terminal or connecting body into the union nut leads to relative motion between the wire receiving and guide part and the clamping and terminal units and thus leads to relative motion between the wire ends and the insulation piercing connecting devices. This relative motion leads to the insulation piercing connecting devices cutting through the wire insulation of the wire ends and then making contact with the conductors.

For better understanding, the cable terminal or joint means discussed below is limited to a cable terminal means, with the referred to individual components being the cable terminal component on the one hand and the device terminal component on the other hand.

Therefore, the discussion specifically refers to a cable terminal means for making an electrically conductive connection, which includes one cable terminal component and one device terminal component, of preferably a multi-core cable to an electrical device. The cable terminal component includes a union nut and a wire receiving and guide part; while the device terminal component includes a clamping and terminal unit which is provided with insulation piercing connecting devices and with terminal components, and a sleeve-shaped outside terminal body which is provided with an outside thread which corresponds to the inside thread of the union nut. When the terminal components are being assembled, the wire ends, running at an angle of less than 180° to the insulation piercing connection devices, are squeezed by the insulation piercing connecting devices to pierce the insulation on the wire ends and make electrical connection with the conductors. This occurs when the union nut is screwed onto the terminal body, that is, the insulation piercing connecting devices cut through the wire insulation of the wire ends and making contact with the conductors.

The aforementioned individual parts, that is, the wire receiving and guide part, the clamping and terminal unit, and the terminal or connecting body will now be explained. The following explanation of these individual parts relates to the above addressed cable terminal means in which the terminal or connecting body is called only the terminal body.

The wire receiving and guide part which belongs to the cable terminal component is conventionally provided on the cable side with a single receiving or insertion opening for the receiving all of the wires, or is conventionally provided with a number of receiving or insertion openings which corresponds to the number of individual wires. Moreover, the wire receiving and guide part on the cable side is provided with wire guide channels. If the wire receiving and guide part on the cable side has only one receiving or insertion opening, this receiving or insertion opening then branches into the individual wire guide channels. If, however, on the cable side a number of receiving or insertion openings corresponding to the number of wires to be inserted is utilized, then the individual receiving or insertion openings pass into the wire guide channels.

The wire guide channels, which are within the wire receiving and guide part, are configured and guided taking into consideration the geometry and the arrangement of the insulation piercing connecting devices in the clamping and terminal unit such that the wire ends, to be squeezed by the insulation piercing connecting devices and make contact with the insulation piercing connecting devices, run at the desired angle, for example at an acute angle or at a right angle.

The clamping and terminal unit associated with the device terminal component is provided on the side facing the wire receiving and guide part with insulation piercing connecting devices, and on the other side with terminal components. The insulation piercing connecting devices and the terminal components are metal parts which are generally constructed in one piece having on one end the insulation piercing connecting devices and on the other end the terminal elements. The execution and configuration of the terminal components depends on which type of connection is desired or available for the internal wiring of the corresponding electrical device. In particular, the terminal components can be made as flat connector, wire wrap, or as solder terminal components.

In the cable terminal means under discussion herein, the union nut and the wire receiving and guide part represent the two important functioning elements of the cable terminal component, while the sleeve-shaped terminal body and the clamping and terminal unit represent the two important functional components of the device terminal component. When screwed together, i.e., when the union nut is screwed onto the terminal body, the union nut and the terminal body form a closed housing which holds and surrounds the inner function elements, specifically the wire receiving and guide part and the clamping and terminal unit.

In the known cable terminal or joint means, the union nut and the wire receiving and guide part are two individual parts which are not connected to one another. Nor is a connection allowable because when the union nut is screwed onto the terminal or connecting body the wire receiving and guide part may not turn or cannot turn. This connection has the consequence that when the terminal or connection is unscrewed again, i.e., unscrewing the union nut from the terminal or connecting body, the cable remains connected or joined because the insulation piercing connecting devices of the clamping and terminal unit are still "fixing" the clamped conductors. Therefore, to disassemble the terminal or the connection after unscrewing the union nut from the terminal or connecting body additional loosening of the conductors held by the insulation piercing connecting devices is required.

The aforementioned problem is essentially solved in the cable terminal or joint means as set forth in related German patent application DE 199 51 455, and corresponding U.S. patent application Ser. No. 09/695,415, in that the wire receiving and guide part is axially fixed via at least one slotted, elastic locking ring in the union nut and that the wire receiving and guide part can be turned in the axially fixed position relative to the union nut.

This has the major advantage that the relative axial motion between the union nut and the terminal or connecting body which accompanies the unscrewing of the union nut from the terminal or connecting body is also the relative axial motion between the wire receiving and guide part and the terminal or connecting body. This relative motion necessarily leads to the conductors, which were clamped by the insulation piercing connecting device, coming free from the insulation piercing connecting devices. If in the cable terminal or joint means as set forth in the noted related patent applications, and as also accomplished in the prior art, the clamping and terminal unit is fixed in the terminal or connecting body, as set forth in the mentioned related patent applications, then there is a cable terminal or joint means which is formed functionally of only two components, specifically the cable terminal component or the first cable joint component on the one hand and the device terminal component or the second cable joint component on the other.

The elastic locking ring is held in the unassembled state on the wire receiving and guide part and the union nut, preferably on the wire receiving and guide part. To do this, the wire receiving and guide part is provided with several axial holding projections which are each provided on the end side with feed bevels to allow the locking ring to be slipped on more easily.

This embodiment however, entails the risk that the locking ring can be lost before installation of the cable terminal means, i.e., before the union nut is screwed onto the terminal body. This can also happen when the cable terminal means is installed, i.e., when the union nut is screwed onto the terminal body and the locking ring is pushed by the wire receiving and guide part.

SUMMARY OF THE INVENTION

The instant invention provides a solution to the problem set forth in regard to the related German patent application DE 199 51 455, and corresponding U.S. patent application Ser. No. 09/695,415, by preventing unintentional loosening of the locking ring from the wire receiving and guide part.

This object is achieved in the cable terminal or joint means of the instant invention when the locking ring is made in one piece with the wire receiving and guide part. Because the locking ring is no longer made as a separate component, on the one hand, one installation step, specifically slipping the locking ring onto the wire receiving and guide part, is eliminated; while, on the other hand, the possible loss of the locking ring is prevented.

Essentially for the cable terminal or joint means as set forth in related patent applications DE 199 51 455 and 09/695,415 there are two possibilities for the sequence in which the cable can be connected to the cable terminal component or to the first cable joint component. In the first possibility, first the wire receiving and guide part can be axially fixed in the union nut and then the multi-core cable with the individual wires can be inserted through the union nut and the receiving and insertion opening into the wire receiving and guide part. In this first instance, the insertion of the individual wires into the wire guide channels of the wire receiving and guide part is made more difficult by the wire receiving and guide part being at I cast partially covered by the union nut. That is, the receiving and insertion opening is located within the union nut and is thus somewhat more difficult to access. In the second possibility, first the multi-core cable can be connected to the wire receiving and guide part, i.e., the cable is pushed through the receiving and insertion opening and the individual wires are inserted into the wire guide channels. Only then are the wire receiving and guide part and the union nut joined. Here, the insertion of the cable and the individual wires is indeed simpler, but the danger is greater that the elastic locking ring will be lost before joining the wire receiving and guide part and the union nut. This circumstance is prevented when the wire receiving and guide part and the locking ring are made in one-piece of the instant invention.

For the one-piece fabrication of the locking ring with the wire receiving and guide part however the following must be watched. When the wire receiving and guide part and the union nut are joined together, the locking ring which in its cross section is not larger than the diameter of the inside thread of the union nut must be turned through the inside thread of the union nut to its end. In doing so, the locking ring according to the thread pitch of the union nut assumes an axial slant. If the locking ring is made in one piece with the wire receiving and guide part, the slant of the locking ring first leads to the wire receiving and guide part assuming an axial slant. It has now been recognized as part of the instant invention that the slightly slanted position of the wire receiving and guide part can be tolerated when the union nut is screwed on. However, it is advantageous if the locking ring has a certain mobility relative to the wire receiving and guide part in spite of its being made in one piece with the wire receiving and guide part.

This is achieved according to one preferred embodiment of the invention when the locking ring is connected to the wire receiving and guide part via retaining bars. If the locking ring is connected only via the retaining bars and not over the entire periphery of the wire receiving and guide part to the latter, as a result of the elastic properties of the locking ring and due to the fact that the locking ring is a slotted locking ring, a certain mobility of the locking ring arises relative to the wire receiving and guide part. Thus, the locking ring can assume an axial slant according to the thread pitch while the wire receiving and guide part experiences only a much smaller slant or none at all.

In addition to attaching the locking ring with the wire receiving and guide part via retaining bars it is also possible to connect the locking ring to the wire receiving and guide part via a film hinge or a thin membrane. The film hinge or the thin membrane also ensures a certain mobility of the locking ring relative to the wire receiving and guide part. Of course, it is also possible to connect the locking ring to the wire receiving and guide part both via one or more retaining bars and also via a film hinge or a thin membrane.

In particular, there are a host of possibilities for embodying and developing the cable terminal or joint means of the invention as can be envisioned from the following discussion of the invention.

DETAILED DESCRIPTION OF THE INVENTION

Figure 1:
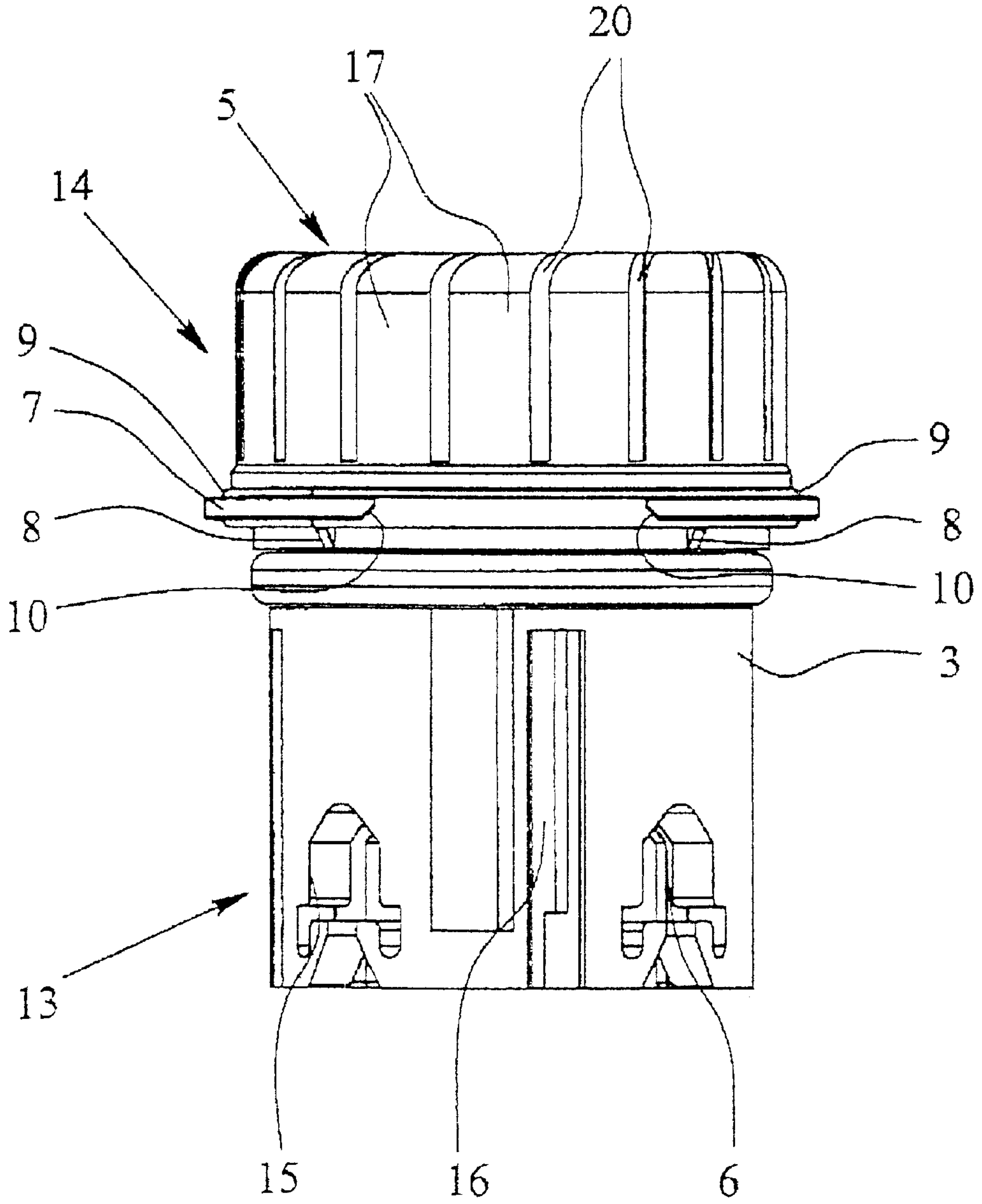
FIG. 1 shows a side view of the wire receiving and guide part of the cable terminal or joint means of the invention.

The instant invention is a cable terminal and joint means for making an electrically conductive connection of a cable (not shown) to an electrical device (also not shown) or for electrical connection of two cables. When the invention is for connecting one cable to an electrical device, it is a cable terminal means; however, if two cables are to be connected to one another, then it is a cable joint means. Hereinafter, for the sake of simplicity, the discussion of the invention will focus on a cable terminal means, as is shown for example in FIG. 1 of U.S. patent application Ser. No. 09/695,415, which is hereby incorporated by reference. For an understanding of how the cable terminal means shown therein can be assembled into a cable joint means reference is made to the German Utility Model 295 12 585 and U.S. Pat. No. 5,989,056, especially from a comparison of the cable terminal means shown in FIGS. 1 to 4 with the cable joint means shown in FIG. 5 of U.S. Pat. No. 5,989,056.

In terms of its basic structure, the cable terminal means is formed of a cable terminal component 1 and a device terminal component. In particular, the cable terminal component 1 includes a union nut 2 and a wire receiving and guide part 3, while the device terminal component includes a clamping and terminal unit (illustrated in U.S. Pat. No. 5,989,056) which is provided with insulation piercing connecting devices and with terminal components, and a sleeve-shaped terminal body (illustrated in U.S. Pat. No. 5,989,056) which is provided with an outside thread which corresponds to the inside thread 4 of the union nut 2.

The wire receiving and guide part 2 which belongs to the cable terminal component 1 is provided on the cable side with a receiving and insertion opening 5. Moreover, the wire receiving and guide part 3 in particular has wire guide channels which are not shown individually. The receiving and insertion opening 5 passes into the wire guide channels.

Figure 2:
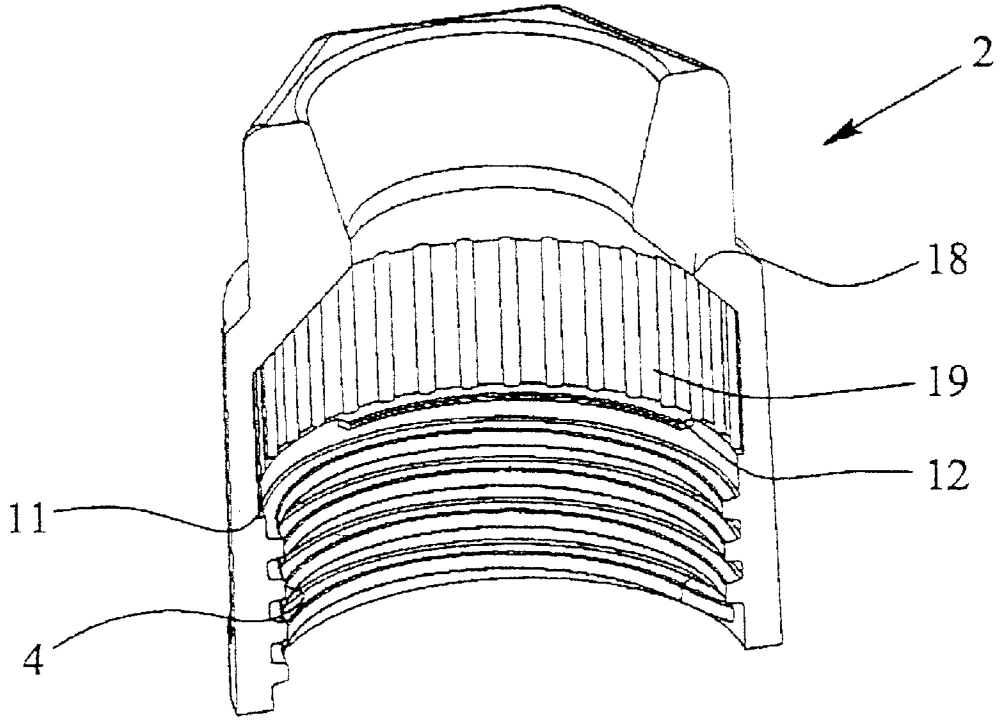
FIG. 2 shows a section through a union nut of the invention.

As also shown by FIGS. 1 and 2 of U.S. Pat. No. 5,989,056, the wire receiving and guide part 3 of the instant invention is provided with notches 6 or cutting contact slots which project into the interior of the wire receiving and guide part 3. When the cable terminal component 1 and the device terminal component are joined, that is, specifically when the union nut 2 is screwed onto the terminal body, the insulation piercing connecting devices of the clamping and terminal unit successively penetrate into the notches 6, which are provided in the wire receiving and guide part 3, to penetrate the wire insulation of the individual wires and then make contact with the individual conductors.

It is important to the invention of the incorporated U.S. patent application Ser. No. 09/695.415 that the wire receiving and guide part 3 is axially fixed via at least one slotted elastic locking ring 7 in the union nut 2 and that the wire receiving and guide part 3 in the axially fixed position can be turned relative to the union nut 2. This has the major advantage that the relative axial movement, which accompanies the unscrewing of the union nut 2 from the terminal body, between the union nut 2 and the terminal body is then also the relative axial motion between the wire receiving and guide part 3 and the terminal body which leads to the conductors that have been clamped beforehand in the insulation piercing connecting devices now coming free from the insulation piercing connecting devices.

While in the cable terminal or joint means of the invention of the incorporated U.S. patent application Ser. No. 09/695,415 the locking ring 7 is a separate component which is held using the axial holding projections on the wire receiving and guide part 3, in the improvement of the instant invention the locking ring 7 is made in one piece with the wire receiving and guide part 3. In doing so, the locking ring 7 is connected to the wire receiving and guide part 3 via several retaining bars 8 and a film hinge 9 which runs in the peripheral direction of the wire receiving and guide part 3. In addition to the embodiment illustrated where the locking ring 7 is connected to the wire receiving and guide part 3 both via retaining bars 8 and also via a film hinge 9, it is also possible to connect the locking ring 7 to the wire receiving and guide part 3 only via retaining bars 8 or via only one film hinge 9.

Figure 3:
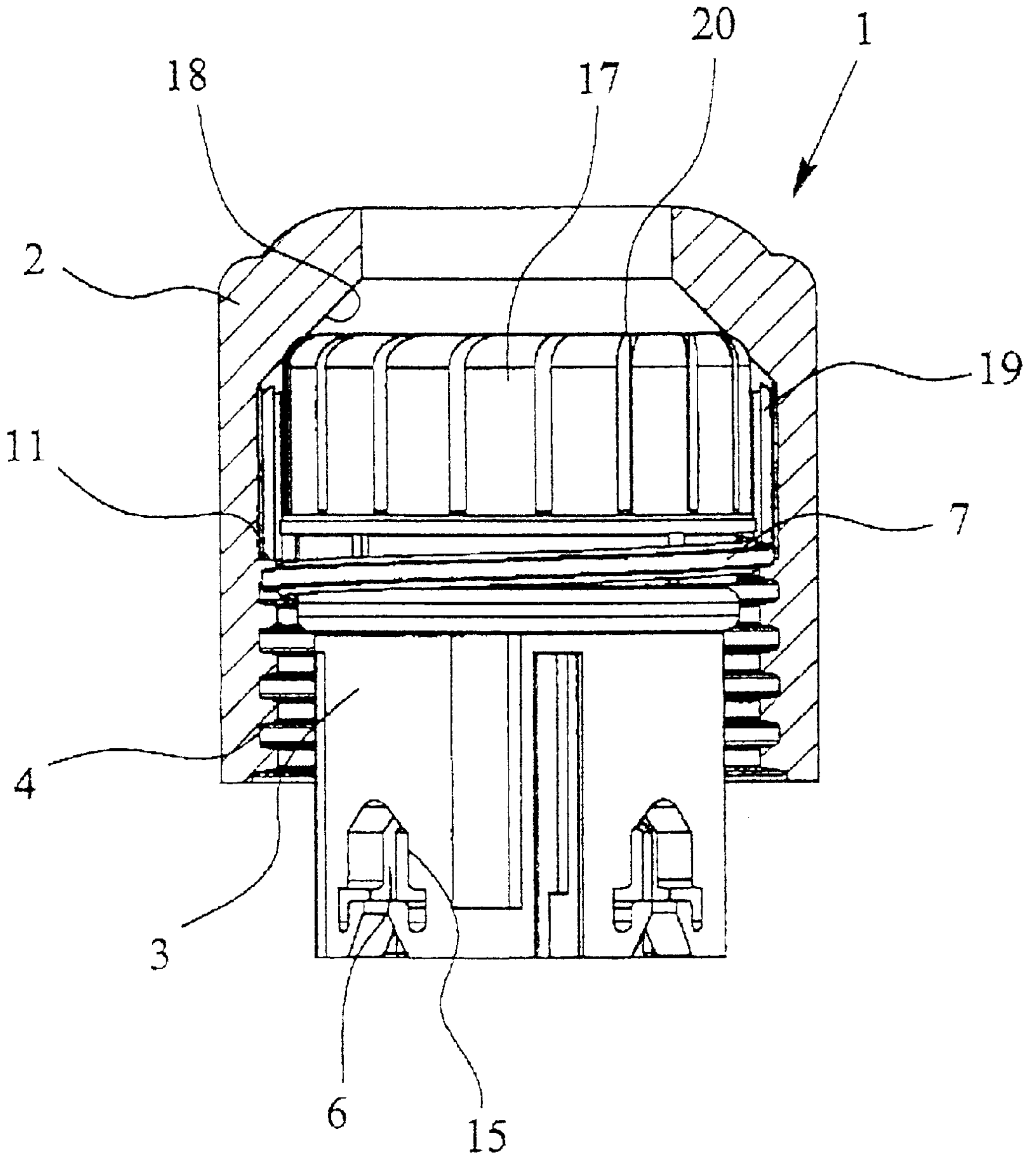
FIG. 3 shows a view of the wire receiving and guide part in the process of insertion into the union nut.

It is common to each of the connection possibilities, all of which are not specifically enumerated, that in spite of the wire receiving and guide part 3 and locking ring 7 being made in one piece, the locking ring 7 has a certain "mobility" relative to the wire receiving and guide part 3. The certain "mobility" of the locking ring 7 relative to the wire receiving and guide part 3 is achieved by a locking ring 7 that, at least over part of its circumference, is not rigidly connected to the wire receiving and guide part 3. If the locking ring 7 is connected, for example, only via the retaining bars 8 to the wire receiving and guide part 3, at least the ends of the locking ring 7, due to elastic properties of the locking ring 7, can be deflected in the axial direction of the wire receiving and guide part 3. When the wire receiving and guide part 3 is screwed onto the union nut 2, the locking ring 7 assumes an inclination according to the pitch of the inside thread 4 of the union nut 2 as shown in FIG. 3. The greater the axial mobility of the locking ring 7 relative to the wire receiving and guide part 3, the smaller the axial slant of the wire receiving and guide part 3 itself, a small slant of the wire receiving and guide part 3 not being a problem when the union nut 2 is screwed on for the function of the cable terminal and joint means.

For axially locking the locking ring 7 within the union nut 2, there is a projection I behind which the locking ring 7 fits when the union nut and the wire receiving and guiding part are in the assembled state. If the wire receiving and guide part 3 and the union nut 2 are completely joined, the locking ring 7 is no longer guided in the inside thread 4 of the union nut 2, but returns again to its horizontal position. In this state, the locking ring 7 then fits behind the projection 11.

FIG. 2 shows that within the union nut 2 there is at least one stop element 12 which will adjoin the locking ring 7 when the wire receiving and guide part 3 and the union nut 2 are in the assembled state. The locking ring 7 is then located between the projection 11 and the stop element 12. The stop element 12 thus prevents the wire receiving and guide part 3 from being pushed beyond the stop element 12 into the union nut 2.

The wire receiving and guide part 3, as follows especially from FIGS. 1 and 3, has two areas, specifically a wire guidance area 13 and a tension relief and sealing area 14. In the wire guidance area 13 there are wire guide channels for the individual wires. On the outside of the wire guide area 13 there are recesses 15 which are used as restraining catches for the conductors when folded laterally. In addition, on the wire guide region 13 there are grooves 16 which interact with the corresponding springs (not shown) in the terminal body and in doing so are used as coding when the wires are connected to the clamping and terminal unit. The tension relief and sealing area 14 of the wire receiving and guide part 3 has a plurality of plates 17 arranged in a ring and which are adjoined on the inside by a sealing ring (not shown here). The plates 17 interact with the bevel 18 which is provided on the inside on the union nut 2 as a so-called PG screw union so that when the union nut 2 is screwed onto the terminal body the plates 17 are pressed against the sealing ring and thus provide a seal to the cable. At the same time tension relief for the cable occurs.

It can be finally seen in FIG. 2, the union nut 2 has several ribs 19 on the inside. The ribs 19 when in the joined state of the wire receiving and guide part 2 and union nut 2 interact with the plates 17 such that the individual ribs 19 fit into the recesses 20 between the plates 17; this leads to a ratchet effect. This ratchet effect is used to protect the union nut from coming loose since the interaction of the ribs 19 and the recesses 20 prevents the union nut 2 from becoming loose independently.

What is claimed is:

1. Cable terminal or joint means for making an electrically conductive connection of a multi-core cable to an electrical device or for making an electrically conductive connection of two multi-core cables, comprising a union nut having an inside thread, a wire receiving and guide part having a plurality of wire guide channels, a clamping and terminal unit having insulation piercing connecting devices and terminal elements, and a sleeve-like terminal or connecting body having an outside thread which corresponds to an inside thread of the union nut, wherein when the union nut is screwed onto the terminal or connecting body or when the terminal or connecting body is screwed into the union nut, the wire receiving and guide part becomes axially fixed via at least one slotted, elastic locking ring inside the union nut such that the wire receiving and guide part is capable of turning relative to the union nut while in the axially fixed position, and wherein the locking ring is fabricated in one piece with the wire receiving and guide part.

2. Cable terminal or joint means as claimed in claim 1, wherein the locking ring is connected via retaining bars to the wire receiving and guide part.

3. Cable terminal or joint means as claimed in claim 2, wherein the locking ring is also connected to the wire receiving and guide part via a film hinge.

4. Cable terminal or joint means as claimed claim 3, wherein, within the interior of the union nut, there is provided at least one projection or groove for engaging the locking ring and axially fixing the wire receiving and guide part.

5. Cable terminal or joint means as claimed in claim 4, wherein, within the interior of the union nut, there is provided at least one stop element such that, when the wire receiving and guide part and the union nut are screwed together, the locking ring adjoins the at least one stop element.

6. Cable terminal or joint means as claimed in claim 5, wherein the wire receiving and guide part is provided with a tension relief and sealing area comprising several plates arranged in a ring, and wherein the union nut is provided with several ribs on the interior thereof such that, when the wire receiving and guide part and the union nut are screwed together, the plates and the ribs interact.

7. Cable terminal or joint means as claimed in claim 1, wherein the locking ring is connected to the wire receiving and guide part via a film hinge.

8. Cable terminal or joint means as claimed claim 1, wherein, within the interior of the union nut, there is provided at least one projection or groove for engaging the locking ring and axially fixing the wire receiving and guide part.

9. Cable terminal or joint means as claimed in claim 1, wherein, within the interior of the union nut, there is provided at least one stop element such that, when the wire receiving and guide part and the union nut are screwed together, the locking ring adjoins the at least one stop element.

10. Cable terminal or joint means as claimed in claim 1, wherein the wire receiving and guide part is provided with a tension relief and sealing area comprising several plates arranged in a ring, and wherein the union nut is provided with several ribs on the interior thereof such that, when the wire receiving and guide part and the union nut are screwed together, the plates and the ribs interact.

* * * * *